United States Patent [19]

de Goede

[11] 4,163,122
[45] Jul. 31, 1979

[54] METHOD AND APPARATUS FOR AUTOMATICALLY CORRECTING ERRORS IN A CYCLIC ROUTING MEMORY OF A TIME DIVISION MULTIPLEXED TRUNK EXCHANGE

[75] Inventor: Barend L. de Goede, Leidschendam, Netherlands

[73] Assignee: De Staat der Nederlanden, Te Dezen Vertegenwoordigd Door de Directeur-Generaal der Posterijen, Telegrafie en Telefinie, The Hague, Netherlands

[21] Appl. No.: 879,764

[22] Filed: Feb. 21, 1978

Related U.S. Application Data

[63] Continuation-in-part of Ser. No. 688,395, May 20, 1976, abandoned.

[30] Foreign Application Priority Data

May 22, 1975 [NL] Netherlands .......................... 7506031

[51] Int. Cl.² .............................................. H04Q 11/04
[52] U.S. Cl. .............................. 179/15 AT; 179/15 BF
[58] Field of Search ........ 179/15 BF, 15 AT, 15 AQ, 179/18 GF; 340/146.1 A, 146.1 BE

[56] References Cited

U.S. PATENT DOCUMENTS

| | | | |
|---|---|---|---|
| 3,458,659 | 7/1969 | Sternung | 179/15 AQ |
| 3,920,914 | 11/1975 | Regnier | 179/15 AQ |
| 3,952,162 | 4/1976 | Texier | 179/15 AT |
| 3,974,340 | 8/1976 | Ghisler | 179/15 AT |

*Primary Examiner*—David L. Stewart
*Attorney, Agent, or Firm*—Hugh Adam Kirk

[57] ABSTRACT

A method and apparatus for automatically correcting errors in the cyclic routing memory of a four-wire TDM telecommunication exchange. The address data in the cyclic routing memory for the control of each of the two switching paths for one four-wire connection through the exchange are each stored in a separate column of the cyclic routing memory. The address data includes parity bits for the input buffer storage device, and parity and busy bits for the switching matrix and group switch devices. The cyclic routing memory also include a common clock means for synchronizing all of the memory circuits with a given time period for a test word for checking synchronization of all of the memories in the exchange. Thus, if the data for the control of one of the switching paths should be lost due to a fault, these data can be derived from the data for the control of the other switching path of the same connection. This method has the advantage of being able to reconstruct lost switching control data without the necessity of using a complete duplicate memory device for these switching control data.

10 Claims, 3 Drawing Figures

CONTROL PART OF EXCHANGE INCLUDING ONE IB SECTION AND ONE MGPS SECTION, EACH WITH APPROPRIATE CONTROL DEVICES

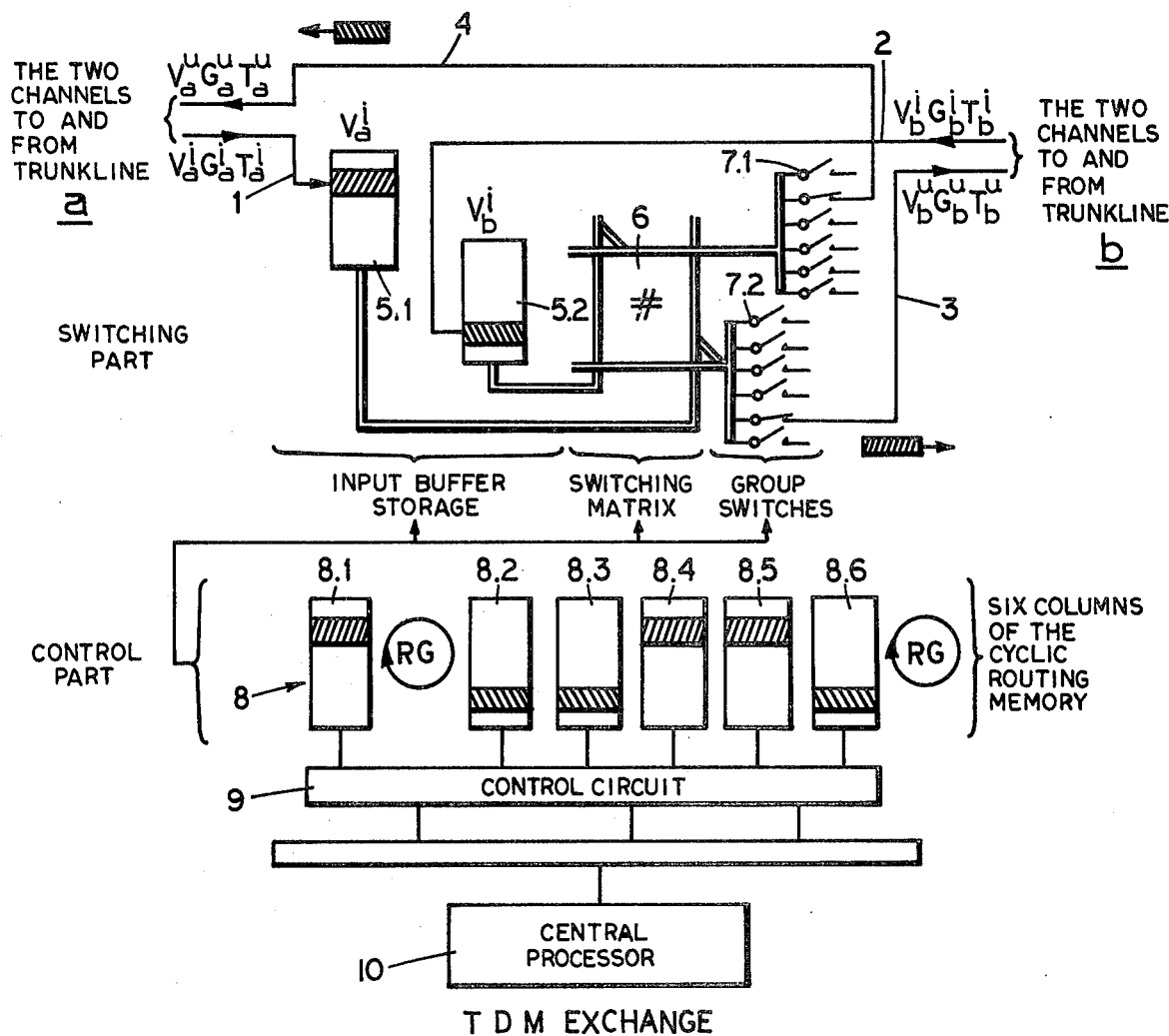
FIG. I (PRIOR ART)
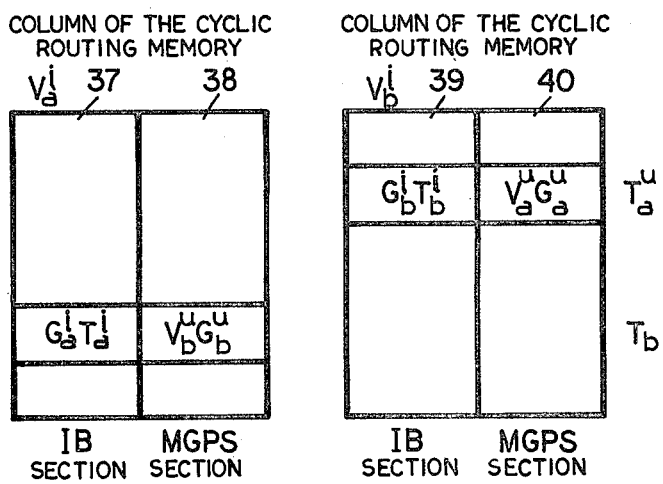
FIG. III

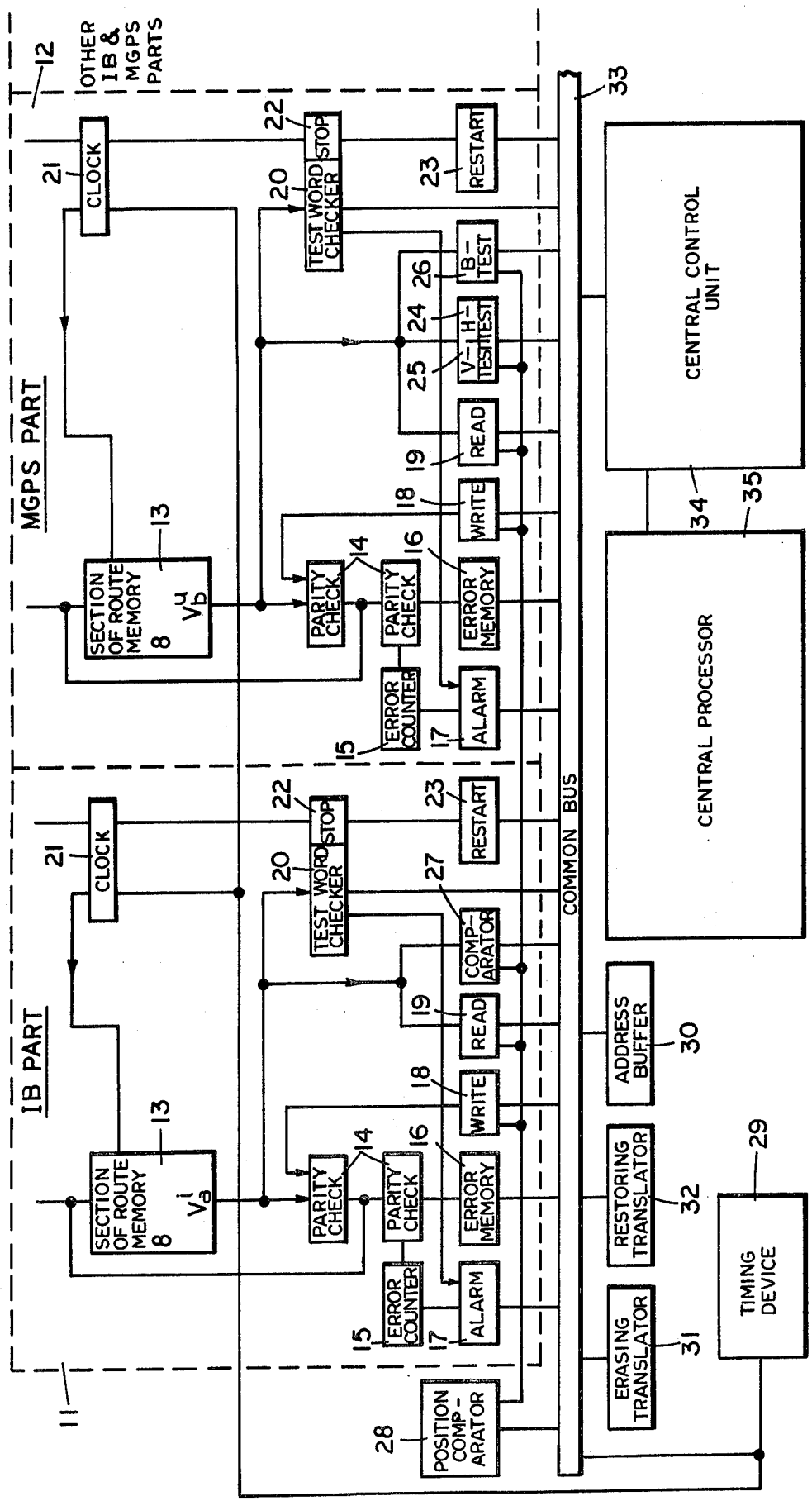
FIG. II
CONTROL PART OF EXCHANGE INCLUDING ONE IB SECTION AND ONE MGPS SECTION, EACH WITH APPROPRIATE CONTROL DEVICES

METHOD AND APPARATUS FOR AUTOMATICALLY CORRECTING ERRORS IN A CYCLIC ROUTING MEMORY OF A TIME DIVISION MULTIPLEXED TRUNK EXCHANGE

RELATED APPLICATIONS

This is a continuation-in-part of applicant's copending U.S. Patent application Ser. No. 688,395 filed May 20, 1976, now abandoned.

BACKGROUND OF THE INVENTION

1. Field of the Invention

The invention relates to telephone or data systems and more particularly to an improved method and apparatus for automatically correcting errors in the cyclic routing memory of a four-wire time division multiplexed (TDM) exchange.

2. Prior Art

Time division multiplexed exchanges usually comprise a switching part and a control part or means.

The switching part is built up in three parts: an incoming device or means, a switching device or element, and an outgoing device or means.

Under the control of the control part, the speech information of each channel to be switched is transmitted from the incoming device through the switching device to the outgoing device. The switching is done on a time-by-time basis in this sense that a part of the speech information of one line is switched through the exchange, then a part of the speech information of a second line is switched through the exchange, etc. till a part of every line has been switched and the cycle can start from the beginning again. This switching is done under control of a cyclic routing memory in the control part. Such a cyclic routing memory which is incorporated in the control part usually consists of a number of rotating memories with a fixed number of lines. Every line usually contains the data to establish one switching path through the exchange. If the information in the cyclic routing memory is completely lost, no switching paths can be established anymore; but if there is a failure in the data in the cyclic routing memory on only line, it is impossible to establish the switching path which is controlled by the data on that line.

The two most frequent failures are:

1. loss of data caused by a disturbance;
2. a physical fault in the cyclic routing memory which is a result of e.g. burn-out.

As the loss of data in such a cyclic routing memory is known in this art as a serious problem, roughly two solutions have been proposed. The first known solution is to double the cyclic routing memory; this gives the best solution in case of a physical defect. The second solution is to use a background store for storing the double data, which will do in most of the cases.

Both the above mentioned solutions have the same disadvantage that the data have to be stored twice and this will double the datatraffic on the databus that interconnects the source of the data and the operational cyclic routing memory, and interconnects the source of the data and second store or spare routing cyclic memory.

All the above is well known to those skilled in the art and the description of some of such TDM exchanges are found in the U.S. Pats. to Sternung, No. 3,458,659 issued July 29, 1969; to Texier et al, No. 3,952,162 issued Apr. 20, 1976; to Ghisler, No. 3,974,340 issued Aug. 10, 1976; and to Regnier et al, No. 3,920,914 issued Nov. 18, 1975; all those described exchanges being of the time-space-time type. The exchange contemplated herein, however, is of the time-space type. A switching device of this type has been described in the magazine "Het PTT-bedrijf", Vol. 18, No. 1, April 1972, Pages 73 through 79.

SUMMARY OF THE INVENTION

In a four-wire exchange for every connection between the four-wire trunklines a and b there has to be established one switching path from a to b and another switching path from b to a. For each of these two switching paths, data are stored in the cyclic routing memory. In the one set of data there is indicated how the switching path should be established from a to b; and in the other set of data there is indicated the establishment of the switching path from b to a.

It is one feature of the invention to provide the method how to derive the data for the switching path from a to b from the data for the switching path from b to a.

In the switching device according to the invention the contents of the cyclic routing memory are not stored in a complete duplicate cyclic routing memory; none the less errors occurring in a column of the cyclic routing memory can be corrected.

The invention is based on the knowledge that, when a four-wire connection comprises at least two communication channels, for each of which a separate switching path is formed, the data, in the cyclic routing memory relative to the switching paths to be established, contain a certain redundancy, which can be utilized for correcting an error.

Therefore the device according to the invention is characterized in that each column of the cyclic routing memory includes two or more separate, co-operating sections, as well as means for deriving data stored in one of these sections from the data contained in two or more other sections of the cyclic routing memory.

Consequently, if in a section containing the data required for setting up one of the two switching paths of one four-wire connection, all or part of these data have gotten lost, they can be recovered from the contents of the column of the cyclic routing memory in which the data for setting up the second switching path of the same four-wire connection are stored. At the same time the control part contains means responsive to parity and busy bits added to each address data for checking the contents of each section for line contents, and means responsive to a test word at a given time period each cycle for checking the rotation synchronization. The control part also contains means for separately stopping and starting the sections of the cyclic routing memory.

Exchanges like the one in question are generally controlled by a central processor.

OBJECTS AND ADVANTAGES

It is an object of the present invention to provide a method and an apparatus for deriving the lost data from other operational data.

The method according to the invention yields a considerable saving, both on the storage capacity and the total handling capacity of the central processor.

Another object of the invention provides a method of error correcting for the control data in a cyclic routing memory wherein the control data for one of the two communication paths in the case of loss can be derived from the control data of the other communication path of the same four-wire connection.

It is a further object of the invention to provide an apparatus for the control of switching paths wherein each column of the cyclic routing memory is divided in at least two sections, the control data of each of the two communication paths being stored in different sections.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. I is a schematic block diagram of a known prior art TDM trunk exchange of the time-space type; and FIG. II is a schematic block wiring diagram of a TDM trunk exchange with one column of the cyclic routing memory and the control parts of each section of that column for carrying out the method of the invention.

FIG. III is a schematic diagram of the contents of the cyclic routing memory shown in FIG. II.

DETAILED DESCRIPTION OF THE VIEWS

Prior Art

Long-distance telecommunication traffic is usually handled on a four-wire basis, so that each communication path comprises two communication channels, viz. one for either direction.

In FIG. I the exchange inlets for two such communication channels are designated by inlets 1 and 2; and outlets 3 and 4, respectively.

As the incoming signals usually leave the switching device again in time slots different from those in which they arrived, they are first stored in an input buffer 5. In the present example there are six input buffers, of which only two, 5.1 and 5.2 are shown.

At the switching moment a signal stored in the input buffer 5 is applied via the columns and rows of a switching matrix 6 to one of the group switches 7, which is closed then. The switching path thus formed e.g. between the inlet 1 and the outlet 3 is established by the cyclic routing memory 8.

The cyclic routing memory 8 comprises six columns, 8.1 . . . 8.6, and is controlled by a control circuit 9, which may be connected to a central processing unit 10. Writing to and erasing from the cyclic routing memory 8 is ensured by the control circuit 9. Each of the columns 8.1 . . . 8.6 of the cyclic routing memory 8 contains a number of lines, on each of which the data required for the establishing one switching path have been recorded: these data concern a line in the input buffer 5, a crosspoint in the switching matrix 6, and one of the group switches 7. At the switching moment for a specified outgoing channel the signal carried by the corresponding incoming channel is put through to it via the input buffer 5.

The incoming signals are designated by their supergroup numbers V, group numbers G, and time slot numbers T of arrival. In the present example there are six supergroups V, each consisting of six groups G, which in their turn contain the information of 32 time slots T each. So in all, the exchange can, in principle, form (6×6×32=) 1152 switching paths by time division multiplex.

A connection between a trunkline a and a trunkline b employs two channels, the incoming signals of which are designated by $V_a^i G_a^i T_a^i$ and $V_b^i G_b^i T_b^i$. The signals going out to trunkline a and trunkline b are designated by $V_a^u G_a^u T_a^u$ and $V_b^u G_b^u T_b^u$, respectively.

As a rule in a four-wire connection the return channel associated with an incoming channel handled in time slot $T_a^i$ is placed in time slot $T_a^u$.

The cyclic routing memory 8 consists of six columns 8.1 . . . 8.6, each of which controls a supergroup $V_x^i$ of incoming signals. Each of the six columns 8.1 . . . 8.6, which are coupled in the usual way according to the above mentioned "Het PTT-bedrijf" article, consists of a number of lines containing data as described above and is associated with an input buffer and a matrix column. The Table below states the formats of these data:

| To be indicated | Address Capacity | Format |
|---|---|---|
| Line in IB (Input Buffer 5.1, 5.2) | 256 | 8 bits |
| Crosspoint of matrix (6) | 6 | 3 bits |
| Group switch (7.1, 7.2) | 6 | 3 bits |

The cyclic routing memory 8 comprises 512 lines, each having a width of 14 bits per column. Such a column may consist of 14 cyclic shift registers of 512 positions each, so that the complete cyclic routing memory has 6×512×14=43008 bits memory capacity.

For each of the switching paths a column of the cyclic routing memory contains a 14-bit word having the following contents: for the a-b channel the word $G_a^i T_a^i V_b^u G_b^u$ in column $V_a^i$ and for the b-a channel the word $G_b^i T_b^i V_a^u G_a^u$ in column $V_b^i$. The incoming supergroups $V_a^i$ and $V_b^i$ do not occur explicitly in the cyclic routing memory, but they can be derived from the column number; the outgoing time slot numbers $T_a^u$ and $T_b^u$ are determined by the cyclic routing memory position.

It is obvious that if the information stored in some line of the cyclic routing memory gets lost, the relevant switching path cannot be established.

THE INVENTION

Therefore, according to the invention, each column of the cyclic routing memory is divided into so many sections that the contents of a line portion can be derived from lines in other sections. For deriving the contents of a line portion use is made of the redundancy of the data contained in this type of cyclic routing memory.

In the present embodiment each column of the cyclic routing memory is divided into two sections. As regards the a-b path, the routing word is divided into the words $G_a^i T_a^i$ and $V_b^u G_b^u$. For the b-a paths it is divided into the words $G_b^i T_b^i$ and $V_a^u G_a^u$. As one section contains the input buffer data $(G_x^i T_x^i)$, it is called IB section; the other section, which contains the matrix and group switch data $(V_x^u G_x^u)$, is called MGPS section.

According to the invention the words in the IB section and those in the MGPS section are checked separately. For this purpose a ninth bit P serving as parity bit is added to the eight bits of the IB section in the Table. Two bits BP are added to the six bits of the MGPS section, viz. a busy bit (B) and a parity bit (P). Thanks to the provision of a busy bit B, the availability check of a line can be made by means of one bit and with a higher reliability. Thus completed, a line consists of 17 bits, as is indicated below.

| IB section (= 9 bits) | MGPS section (= 8 bits) |
|---|---|
| 12345678P | 123456BP | in which P represents a parity bit, and B represents the busy bit. Thus about 18% redundancy has been added to the cyclic routing memory, so that its total capacity amounts to 52,224 bits (6×512×17).

The cyclic routing memory 8 must work in synchronism with the exchange clock 29 (see FIG. II described below). The timing provided by this central timing device 29 is accepted as a measure by the control device. To enable a check of synchronism, a reference line has been provided. For this purpose a unique combination is recorded at t=0 in the cyclic routing memory sections. This unique combination, the test word, must be recognized at very rotation so as to indicate that the circuit has operated. A different combination, recorded at t=1, enables the equipment to detect whether the section has stopped at the very instant when the test word happened to appear at the test gate.

ERROR DETECTION AND CORRECTION

The operation of the cyclic routing memory can be affected by the following disturbances or types of errors:
1. one or more shift registers are faulty;
2. an entire section is faulty;
3. an incidental error in the control bits;
4. an incidental error in the check bits;
5. an incidental error in the rotation mechanism and the consequent phase shift with respect to the central timing;
6. combinations of the above mentioned disturbances.

The detection and correction of errors will now be explained with the aid of FIG. II which represents a part of the four-wire exchange, in which only one column of the cyclic routing memory 8 is designed consisting of an IB section and associated equipment 11 and an MGPS section and associated equipment 12; other columns can be connected to a common bus 33 in the same way.

Both control parts 11 and 12 contain a section 13 of the cyclic routing memory 8, a parity checking device 14, an error counter 15, an error memory 16—in which the number of the incorrect line or sub-period is recorded—, an alarm circuit 17, which gives an alarm signal when the admissible number of errors is exceeded, a write circuit 18 for writing in the cyclic routing memory, a read circuit 19, a test word checking circuit 20 and a clock 21, as well as a stop command circuit 22 and a restart common circuit 23. The test word checking circuit 20 checks whether in one or more specified sub-periods the test words are present in the cyclic routing memory.

The cooperation between the test word checker 20, the stop command circuit 22 and the restart command circuit 23 is as follows: when the test word checker does not find the test word in the section 13 of the cyclic routing memory at the time t=0, which time is indicated on the common bus 33, the stop command circuit 22 is operated at the moment the test word is found. This stop command circuit 22 prevents the clock 21 to give further clock pulses to the section 13, which stops rotating. As soon as restart command circuit 23 receives the signal t=0 from the common bus 33 the stop command circuit 22 is deblocked and the section 13 starts rotating again. From those circuits the test word checker 20 is a comparator circuit, and thus the stop command circuit 22 and the restart command circuit 23 can be implemented by rather simple gating circuits.

In addition to the above mentioned parts the MGPS part contains, for the purpose of testing blockings in the switching network, a horizontal test circuit 24, a vertical test circuit 25 and a free sub-period test circuit 26 for testing a line for the presence of a busy bit. The horizontal test circuit 24 is intended for call-set-up procedures under fault-free conditions only, and the working is not part of this invention.

The vertical test circuit 25 is a comparator which can test the MGPS section on the presence of a bit pattern $V_x^u G_x^u$ in a sub-period indicated by the position comparator 28. If the bit pattern $V_x^u G_x^u$ is found, the read circuit 19 of the appropriate IB part 11 reads out the information on the same line of the IB section 13; this is done in the case of a fault in the MGPS part of an other column. The comparator 27 tests, in the same way as the vertical test circuit 25, the lines of the IB section on the presence of a bit pattern $G_x^i T_x^i$ in a sub-period indicated by the position comparator 28. When this bit pattern is found the read circuit 19 of the appropriate MGPS part reads the contents $V_y^u G_y^u$ of the same line in the MGPS section. The position comparator 28 is used for reasons of time-saving. Such a device could as well have been incorporated in each of the devices 18, 19, 27, 25 and 26; when one of the devices has to fulfil a function in a certain sub-period the device is ordered to do so by the central control unit 34. The position comparator 28 compares the number of the sub-period in which the function is to be fulfilled with the number of the sub-period of the timing device 29. When this sub-period is found the position comparator 28 enables the relevant device to fulfil its function. The timing device 29 gives sequentially the 512 numbers of the sub-periods on the common bus 33 and provides the clocks 21 in the IB and MGPS parts with the necessary timing information.

An address buffer 30 has been designed for storing intermediate results during extensive operations.

An erasing translater 31 is used in case of a fault in an MGPS section of the cyclic routing memory. When such a fault occurs the input buffer number $V_x^i$ is entered into this translator as well as the bit pattern $G_x^i T_x^i$ from the same line of the appropriate IB section. So the erasing translator 31 carries out the following operation: $V_x^i + G_x^i T_x^i \rightarrow V_x^u G_x^u$, which can be easily done as there is a fixed algorithm between i and u. In a preferred embodiment i=u so that the translator 31 can be implemented in its simplest form as a shift register.

A restoring translator 32 is used in case of a fault in an IB section of the cyclic routing memory. When such a fault occurs, the sub-period $T_x^u$ is entered into the translator as well as $V_x^u G_x^u$. The restoring translator 32 carries out the following operation: $V_x^u G_x^u + T_x^u \rightarrow G_x^i T_x^i$. In its simplest form, viz. if i=u, the restoring translator can be implemented as a shift register.

The common bus 33 connects the circuits to the central unit 34. This control unit is a sub-processor for the control of the cyclic routing memory and its appropriate functions only. The central control unit can perform a number of fixed functions, among which there are the error correction functions to be described later in detail in connection with the enumeration of errors given above. The central control unit is connected with a control processor 35 for the overall control of the exchange.

According to the invention the cyclic routing memory can be extended by one or more *spare* sections, each of which can take over the functions of a faulty section, after the data recorded in it before the fault occurred, have been recovered and stored in a spare section.

DETAILED DESCRIPTION OF THE ERRORS TO BE DETECTED

The various errors can be detected as follows:

re 1. If one shift register does not work correctly, whereas the other shift registers of the same section do operate properly, the parity pattern will always contain errors. That need not be the case at every switching-through moment or sub-period; as determined by the recorded information and the fact that the parity error will occur more or less often in a rotation. To enable a decision as to whether this type of fault has occurred indeed, a minimum number of errors must have been detected in the parity check. For this purpose a counter 15 has been provided; it controls an alarm device 17 when it finds more than three errors per rotation. It is possible that the error referred to here makes the recognition of the test word on $t=0$ impossible. In that case, the detection procedures for the errors 1, 2 and 5 mentioned above run parallel.

re 2. If a whole section does not function, the test word that was recorded at $t=0$ cannot pass the checking point at the correct moment. In order that an incidental error in the cyclic operation of section 13 of the cyclic routing memory can be distinguished from a serious breakdown as meant here, a special arrangement has to be made. The consequences of such a fatal fault are so serious that there must be sufficient certainty about the nature of the fault. See re 5 below.

re 3. One error in a word can be detected by the parity check. As the parity check does not reveal which bit is wrong, the whole of the information must be rejected. If this information is erased in the relevant column, the connection that was switched by it is lost.

re 4. An incidental error in the check bits is not distinguished from an error in the information bits by the parity check. As was mentioned re 3 above, a possible measure consists in erasing the two words from the relevant section.

re 5. A phase difference with respect to the central timing due to e.g. an incidental error in the clock signals for some section is detected because the test word fails to appear at $t=0$. So in this respect there is no difference with the errors mentioned under error 2 type mentioned above. There is a difference, however, in that it is possible in this case to maintain the section, which is impossible in the case of fatal errors. The following method can be applied to find out whether an error is of the case 2 type or of the case 5 type error: stop recording in the suspect column, rotate til the test word has been seen and then stop rotating. Then wait till the central timing indicates $t=0$, start rotating again and check if the test word has reappeared after one 125 $\mu$s cycle. If not, error 2 type can be decided on. In that case an alarm must be given.

If there occur such errors in the operation of the cyclic routing memory that essential functions of the switching device are jeopardized, an alarm must be given. This applies to errors of 1 and 2 types. No alarm is required if incidental errors of the 3, 4 or 5 type have been corrected on detection.

An alarm can initiate an automatic correcting procedure, in which faulty components are replaced. If there appears a type 3 or 4 error in a 17-bits word of a column, the remaining—useless—information can be erased. The other word associated with the call remains behind alone. Without further measures the lines containing this word would be lost for following calls to be completed. In the case of a fault requiring the replacement of a pcb (printed circuit board), several of these duplicate words will remain behind. Thus the exchange could get blocked by cyclic routing memory obstruction. This is unacceptable and measures will have to be taken against it. Besides erasing the two words for the control of the switching path it is possible to re-establish the faulty connection.

Thanks to the division of the columns into two sections each of which is protected by a parity check, it is possible to recover the lines in which the connection was switched through.

The procedure by which lost information is recovered without intervention of the processor can be used in the case of faults of the types 1, 2, 3 and 4, providing the error only occurs in one section at a time, because this procedure utilizes the information that remains intact in the cyclic routing memory 8. This information consists of two parts:

a. the information stored in the same column, in the sub-period of the fault, in the other section;

b. the information utilized for establishing the switching path of the other switching path of the four-wire connection.

RECOVERY OF SWITCHING INFORMATION OR OPERATION OF INVENTION CIRCUITRY

In what precedes, it was stated that most errors in the information of one of the sections of the route memory can be corrected automatically. To implement the correcting procedure each section of the cyclic routing memory is provided with a logic circuit (see FIG. II, 11 and 12) which operates as much as possible independently of the processor. After the detection of an error in the information on a line of some section, the contents of that line in the associated section of the same column is transferred to a translator device (31, 32), which derives search keys or digital words from the digital words indicating $V_x{}^i$ and $G_x{}^i T_x{}^i$ into a digital word indicating $V_x{}^u G_x{}^u$, thence enabling the search for the location containing the information required for correcting the faulty line. Consequently, this correcting procedure is only feasible, if the erroneous information forms part of a two-way connection through the switching network, for which the two switching words are stored in different columns of the cyclic routing memory.

Now, by way of example, the correction of an incidental error of type 3 and 4 in the cyclic routing memory of the IB control part 11 will be described. In such a case the parity tester 14 detects a parity fault in section 13 and advances the error counter 15 by one step. The sub-period number of the faulty line is recorded in the error memory 16. When the error counter attains a record of three or more within one routing memory cycle, the alarm device 17 operates and the central control unit 34, after the replacement of control part 11, replaces the contents of the whole column into a spare column in about the same way as will be described below for a single error correction.

If the record of the error counter 15 is less than three, the following operations take place on a command from the central control unit 34. The contents of the error memory 16 are transferred to the position comparator 28, which waits till the sub-period searched for reappears. When the vertical test circuit 25 in the MGPS control part 12 signals the occurrence of the sub-period searched for, the contents of this line are read by the reading device 19 and transferred to the correction translator 32. The latter device translates $V_x^u G_x^u$ and $T_b$ into $G_b^i T_b^i$ after which this new datum is written to the correcting comparator 27 of the IB control part 11 of column $V_b$. Then the search area includes all the positions of the IB control part 11 of column $V_b^i$. When the sought line is found, the contents of the MGPS control part 12 of the column $V_b^i$ is read. The information stored on this line, $V_a^u G_a^u$ and $T_a$ is transferred to the correction translator 32 and translated into $G_a^i T_a^i$. Then this word is transferred to the writing device 18 of the IB section 11 containing the faulty line. The faulty line is located with the aid of the contents of the position comparator 28. As soon as it is found, the recovered information is written in by the writing device 18.

The steps to be taken will be described once again with reference to FIGS. II and III. In FIG. II 37 and 38 are sections of the same column of the cyclic routing memory; sections 39 and 40 are sections of an other column of the cyclic routing memory. Sections 37 and 39 are IB sections (13 in box 11 of FIG. II); sections 38 and 40 are MGPS sections of the cyclic routing memory.

$T_a$ is the line corresponding to timeslot Ta in which the switching path from b to a is established; $T_b$ is the line corresponding to timeslot Tb in which the switching path from a to b is established.

The following steps represent the deriving of lost data:

1. Parity check 14 finds out in IB section 37 that the data are lost in timeslot Tb.
2. Reading device 19 reads from corresponding line $T_b$ in MGPS section 38 $V_b^u G_b^u$.
3. Translator 32 translates $V_b^u G_b^u T_b$ into $V_b^i G_b^i T_b^i$ and writes in comparator 27 of IB part of IB section 39.
4. Comparator 27 finds line in IB section 39 where $G_b^i T_b^i$ is stored.
5. When line $T_a$ is found, reading device 19 reads the data $V_a^u G_a^u$ and $T_a$ from corresponding $T_a$ line in MGPS part 40 and brings them into translator 32.
6. Translator 32 translates $V_a^u G_a^u T_a$ into $V_a^i G_a^i T_a^i$.
7. Writing device 18 for IB section 11 writes $G_a^i T_a^i$ into IB part 37.

A similar procedure, but concerning a larger number of lines, can be used if a large part of the contents of a section has gotten lost. In the case of a cyclic routing memory section (11, 12) not working in synchronism, such as an error of type 5, the recording of new data in the route memory is stopped by the stop command circuit 22, after which the test word checking circuit 20 searches for the test word of that section, which is stored at t=0. When it is found, the section is stopped by the stop command circuit 22 and started again by the restart command circuit 23 releasing the stop command circuit 22, when the central timing device 29 indicates the moment t=0. Then the step-by-step rotation is started again, after a test word check has been carried out first by the test word checking circuit 20. If the test word is not found, it can be concluded that the relevant section is faulty.

According to the invention one or more spare sections can be coupled with the normal sections. These spare sections can each take over the function of a section whose information has gotten lost, and they are capable of restoring the contents of the lines, after this information has been retrieved from sections that are still intact.

While there is described above the principles of this invention in connection with specific apparatus, it is to be clearly understood that the description is made only by way of example and not as a limitation to the scope of this invention.

I claim:

1. A method for automatically correcting errors in a cyclic routing memory of a four-wire TMD telecommunication exchange, comprising
   (A) a switching means for switching the two channels of the four-wire connection over two different switching paths, which switching part comprises:
      1. an input means
      2. a switching element
      3. an output means
   (B) a control means for controlling said switching means, which control means comprises:
      4. a cyclic routing memory for consecutively establishing a plurality of switching paths between said input means and said output means via said switching element
      5. a central control unit for providing the cyclic routing memory with switching data,
   said method comprising:
   (a) storing said switching data for the control of the two different direction switching paths of one connection in two separate columns of said cyclic routing memory for each switching path direction, and
   (b) deriving lost switching data in one column for one switching path from the data of the other switching path of the same connection by
      1. finding which direction path had the loss,
      2. transforming the remaining data in said lost path to corresponding data in the other path direction,
      3. finding the location of the path in said other direction which corresponds to the transformed data,
      4. transforming the data from the other found path to reproduce the lost data, and
      5. writing the lost transformed data into said lost path.

2. A method according to claim 1, comprising storing of the data of said input means, said switching element and said output means in separate cooperating sections of said cyclic routing memory.

3. A method according to claim 2, comprising checking the contents of each section of said cyclic routing memory by the presence of checkbits.

4. A method according to claim 1, comprising checking the rotation of said cyclic routing memory by the presence of a test word on a fixed line of said cyclic routing memory.

5. A switching system providing a plurality of switching paths for the switching of a plurality of four-wire telecommunication connections each comprising two channels, which channels are digitally time division multiplexed and which switching device comprises:
(A) a switching means for switching the two channels of the four-wire connection over two different switching paths, which switching means comprises
  (1) an input means
  (2) a switching element
  (3) an output means
(B) a control part for controlling said switching means, which control means comprises:
  (4) a cyclic routing memory for consecutively establishing a plurality of switching paths between said input means and said output means via said switching element, which cyclic routing memory comprises at least two identical columns, and which columns comprise at least two sections in each of which sections a different part of the data for the control of said switching means is stored, and including data of the location of the time slot for the data in the other column, and
  (5) means for deriving lost switching data from one section of one column for the reproduction of said lost data by the other data from said switching connection in the other column of its two sections, comprising:
    (1) means for reading (19) and translating (32) the data stored in the other section of said one column in which the data was lost, to data corresponding thereto recorded in the other column for controlling the opposite direction connection,
    (2) means for writing the resulting translated data in a comparitor (28) for comparing this translated data with the data in the other column to find its corresponding data and for determining location in which it is stored in said other column,
    (3) means for reading (19) and translating (32) the data in said found location from the other section to the corresponding data lost from said one section, and
    (4) means for writing (18) said translated lost data into said lost section location of said one column for reproducing said lost data.

6. A switching system according to claim 5, wherein said control means includes separate means for stopping and starting the cycling of each section of the cyclic routing memory.

7. A switching system according to claim 5, wherein said control means includes test circuit means for finding a free line in each of said columns.

8. A switching system according to claim 5, wherein said control means includes a common timing means for all said sections.

9. A switching system according to claim 5, wherein each section is provided with a separate control means including a parity checking means (14), for checking the bit parity on each line of said section, an error counter (15) for counting the number of errors per cycle, an error memory (16) for recording the numbers of the lines on which an error is found, and an alarm means (17) to produce an alarm signal when the record of the error counter (15) exceeds a predetermined number.

10. A switching system according to claim 5, wherein said cyclic routing memory includes at least one spare section to store switching data derived from the switching data in an other column of the cyclic routing memory.

* * * * *

UNITED STATES PATENT AND TRADEMARK OFFICE
CERTIFICATE OF CORRECTION

PATENT NO. : 4,163,122
DATED : July 31, 1979
INVENTOR(S) : Barend L. de Goede

It is certified that error appears in the above-identified patent and that said Letters Patent are hereby corrected as shown below:

Column 1, line 21, after "switching part" insert -- or means --; line 43, after "only" insert -- one --. Column 5, line 19, change "very" to -- every --; line 54, change "common" to -- command --. Column 10, line 19, change "TMD" to -- TDM --.

Signed and Sealed this

Fourth Day of March 1980

[SEAL]

Attest:

Attesting Officer

SIDNEY A. DIAMOND

Commissioner of Patents and Trademarks